US010231163B2

(12) United States Patent
Chen et al.

(10) Patent No.: US 10,231,163 B2
(45) Date of Patent: Mar. 12, 2019

(54) EFFICIENT CENTRALIZED RESOURCE AND SCHEDULE MANAGEMENT IN TIME SLOTTED CHANNEL HOPPING NETWORKS

(71) Applicant: Convida Wireless, LLC, Wilmington, DE (US)

(72) Inventors: Zhuo Chen, Claymont, DE (US); Chonggang Wang, Princeton, NJ (US); Lijun Dong, San Diego, CA (US); Xu Li, Plainsboro, NJ (US); Quang Ly, North Wales, PA (US); Guang Lu, Thornhill (CA); Shamim Akbar Rahman, Cote St. Luc (CA)

(73) Assignee: Convida Wireless, LLC, Wilmington, DE (US)

( * ) Notice: Subject to any disclaimer, the term of this patent is extended or adjusted under 35 U.S.C. 154(b) by 48 days.

(21) Appl. No.: 15/329,595

(22) PCT Filed: Jul. 31, 2015

(86) PCT No.: PCT/US2015/043202
§ 371 (c)(1),
(2) Date: Jan. 27, 2017

(87) PCT Pub. No.: WO2016/019291
PCT Pub. Date: Feb. 4, 2016

(65) Prior Publication Data
US 2018/0213459 A1  Jul. 26, 2018

Related U.S. Application Data

(60) Provisional application No. 62/031,737, filed on Jul. 31, 2014.

(51) Int. Cl.
*H04W 40/02* (2009.01)
*H04W 74/04* (2009.01)
(Continued)

(52) U.S. Cl.
CPC .......... *H04W 40/02* (2013.01); *H04B 7/2615* (2013.01); *H04W 74/04* (2013.01); *H04W 84/18* (2013.01)

(58) Field of Classification Search
CPC .............................. H04W 40/02; H04W 74/04
See application file for complete search history.

(56) References Cited

U.S. PATENT DOCUMENTS

| | | | | |
|---|---|---|---|---|
| 2015/0023205 A1* | 1/2015 | Vasseur | .................. | H04L 45/02 370/254 |
| 2015/0200738 A1* | 7/2015 | Wetterwald | .......... | H04W 16/02 370/442 |

FOREIGN PATENT DOCUMENTS

EP    2237501 A1    10/2010

OTHER PUBLICATIONS

Wang et al., "A Routing Algorithm for Industrial Wireless Network Based on Deterministic Scheduling", Fourth International conference on Machine Vision (IVMV): Machine Vision, Image Processing, and Pattern Analysis, SPIE, Washington, 8349(1), Dec. 24, 2011, 7 pages.

(Continued)

*Primary Examiner* — Ronald B Abelson
(74) *Attorney, Agent, or Firm* — Baker & Hostetler, LLP

(57) ABSTRACT

The present application is directed to a system and method for allocating a Track in a 6T1SCH network. The method includes the step of receiving a Track computation request in PCEP from a first PCE proxy on a first Backbone router. The method also includes the step of calculating an optimal Track between a source LLN device and a destination LLN device. Further, the method includes the step of sending a Track assignment message to one or more LLN devices in the optimal Track. The present application also is directed to a system and method for reporting TSCH schedule infor- (Continued)

mation to a PCE. Further, the present application is directed to a LLN device.

16 Claims, 16 Drawing Sheets

(51) Int. Cl.
*H04B 7/26* (2006.01)
*H04W 84/18* (2009.01)

(56) References Cited

OTHER PUBLICATIONS

Wang et al., "6TiSCH Operation Sublayer (6top) Interface draft-ieff-6tisch-6top-interface-00", 6TiSCH, Internet-Draft, Mar. 27, 2014, 29 pages.
Vasseur et al., "Path Computation Element (PCE) Communication Protocol (PCEP)", Network Working Group, RFC 5440, Mar. 2009, 87 pages.
Thubert, "Update from Wireless Standards", 2014 ODVA Industry Conference, Mar. 2014, 9 pages.
Thubert, "An Architecture for Ipv6 Over the TSCH Mode of IEEE 802.15.4 draft-ieff-6tisch-Architecture-11", 6TiSCH, Internet-Draft, Jan. 27, 2017, 53 pages.
Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, 541-546.
Thubert et al., "An Architecture for IPv6 Over Timeslotted Channel Hopping Draft-Thubert-6tsch-Architecture-02", Internet-draft, Jan. 14, 2014, 17 pages.
Sudhaakar et al., "6TiSCH Resource Management and Interaction Using CoAP draft-sudhaakar-6tisch-coap-01", Mar. 29, 2014, 14 pages.
Shelby et al., "Neighbor Discovery Optimization for IPv6 over Low-Power Wireless Personal Area Networks (6LoWPANs)", Internet Engineering Task Force (IETF), RFC 6775, Nov. 2012, 55 pages.
Shelby et al., "Constrained Application Protocol (CoAP) draft-ieff-core-coap-18", CoRE Working Group, Internet-Draft, Jun. 28, 2013, 118 pages.
Palattella et al., "Terminology in IPv6 Over Time Slotted Channel Hopping Draft-Palattella-6tsch-Terminology_00", Internet Engineering Task Force (IETF), Internet-Draft, Mar. 10, 2013, 8 pages.
Montenegro et al., "Transmission of IPv6 Packets over IEEE 802.15.4 Networks", Network Working Group, RFC 4944, Sep. 2007, 30 pages.
Kim et al., "Design and Application Sapces for IPv6 over Low-Power Wireless Personal Area Networks (6LoWPANs)", RFC 6558, Apr. 2012, 28 pages.
International Patent Application No. PCT/US2015/043202: International Search Report and the Written Opinion dated Nov. 25, 2015, 14 pages.
International Electrotechnical Commission (IEC) "Industrial Communication Networks—Wireless Communication Network and Communication Profiles—WirelessHART", tmEC 62591, Edition 1.0, Apr. 2010, http://www.hartcomm.org.
IEEE Standard for Local and Metropolitan Area Neworks—"Part 15.4: Low-Rate Wireless Personal Area Networks (LR-WPANs) Amendment 1: MAC sublayer", IEEE Std 802.15.4e, Apr. 16, 2012, 225 pages.
Hui et al., "Compression Format for IPv6 Datagrams over IEEE 802.15.4—Based Networks", Internet Engineering Task Force (IETF), RFC 6282, Sep. 2011, 24 pages.
Hinden et al., "IP Version 6 Addressing Architecture", Network Working Group, RFC 4291, Feb. 2006, 25 pages.
Conta et al., "Internet Control Message Protocol (ICMPv6) for the Internet Protocol Version 6 (IPv6) Specification", Network Working Group, RFC 4443, Mar. 2006, 24 pages.
Chakrabarti et al., "IPv6 Neighbor Discovery Optimizations for Wired and Wireless Networks draft-chakrabarti-nordmark-6man-efficient-nd-0", 6man WG, Internet-Draft, Feb. 14, 2014, 35 pages.
"Internet Control Message Protocol version 6 (ICMPv6) Parameters", Jan. 27, 2017, 8 pages, http://www.iana.org/assignments/icmpv6-parameters/icmv6-parameters.xhtml.

\* cited by examiner

EFFICIENT CENTRALIZED RESOURCE AND SCHEDULE MANAGEMENT IN TIME SLOTTED CHANNEL HOPPING NETWORKS

CROSS-REFERENCE TO RELATED APPLICATIONS

This application is a National Stage Application filed under 35 U.S.C. § 371 of International Application No. PCT/US2015/043202, filed Jul. 31, 2015, which claims priority to U.S. Provisional Application No. 62/031,737, filed Jul. 31, 2014, the disclosures of which are incorporated herein by reference in its entirety.

BACKGROUND

In the field of networking topology, channel hopping strategies have been employed to improve reliability for a low power and lossy network (LLN). Namely, time slotted channel hopping (TSCH) is where time is divided into several timeslots. These timeslots are grouped into one or more slot frames with each slot frame continuously repeating over time.

In the TSCH architecture, issues related to resource and schedule management are prevalent. Specifically, timeslots and channel frequencies in the underlying network between a source LLN device and a destination LLN device are inefficiently managed. For instance, LLN devices in 6TiSCH networks, e.g., IPv6 in TSCH, are resource-constrained and thus may not support session-based transport protocols or application protocols. Moreover, existing control protocols in 6TiSCH networks are inefficient as communication protocols between a path computation element (PCE) and LLN devices. Even if such resources were provided, the protocol header and processing time necessary to process existing protocols, such as UDP and CoAP at each layer, would cause additional overhead and significant delay.

Conventional path computation client communication protocols (PCEP)s and other relevant protocols also are not capable of supporting LLN devices to report schedule information. Moreover, conventional PCEPs and other protocols are not capable of supporting Track reservation in 6TiSCH networks. For instance, the PCE only sends a path computation response to the source node sending a path computation request. By so doing, the PCEP cannot push a Track to all LLN devices existing along a path between the source and the destination LLN devices.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to a process and system for allocating/reserving a Track in a 6TiSCH network. The present application also is directed to a method and system for reporting TSCH schedule information to a PCE.

One aspect of the application is directed to a method for allocating a Track in a 6TiSCH network. A Track computation request in PCEP is received from a first Backbone router. Next, an optimal Track or pathway is calculated from a source LLN device to a destination LLN device. Preferably, a cell schedule is consulted. A Track assignment message is then sent to one or more LLN devices in the optimal Track. In one embodiment, the Track assignment message is sent via the first Backbone router, e.g., BR, to the LLN devices located in the optimal Track. In even another embodiment, the Track assignment message is sent via the first BR to another Backbone router located closer to the LLN devices. In yet even a further embodiment, the Track assignment message is sent to another Backbone router positioned closer to the LLN device on the Track than the first BR.

Another aspect of the application is directed to a method for reporting TSCH schedule information to a PCE. Specifically, TSCH schedule information is received by a backbone router with a PCE proxy from one or more LLN devices via internet control messaging protocols (ICMPs). Upon receipt, the TSCH schedule information is aggregated. The aggregated TSCH schedule information is then sent to a PCE via PCEP protocols.

Yet another aspect of the application is directed to a 6TiSCH network architecture employing plural LLN devices, a Backbone router with a PCE proxy, and a PCE with a cell schedule. In one embodiment, the TSCH schedule information reported from the LLN device to the Backbone router may include one or more of the following information types: a network address, number of soft cells, and timeslot offset and channel offset of a plurality of soft cells. In another embodiment, an aggregated schedule report message from a Backbone router to the PCE may include one or more of the following information types: number of aggregated messages and a plurality of TSCH schedule report messages. In yet another embodiment, the TSCH schedule information is stored by a PCE in a cell schedule database. The cell schedule database may include one or more of the following information types: LLN device address, proxy address, and timeslot offset, channel offset and type of a plurality of scheduled cells.

Yet a further aspect of the application is directed to a computer-implemented LLN device. The LLN devices include a non-transitory memory having instructions stored thereon for allocating a Track in a network. The LLN device also includes a processor, operably coupled to the memory that is configured to perform certain instructions. Namely, the instructions includes (i) sending a Track allocation request message in ICMP to a backbone router; (ii) receiving a Track allocation reply message from the backbone router; and (iii) sending a confirmation message to the backbone router.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1:
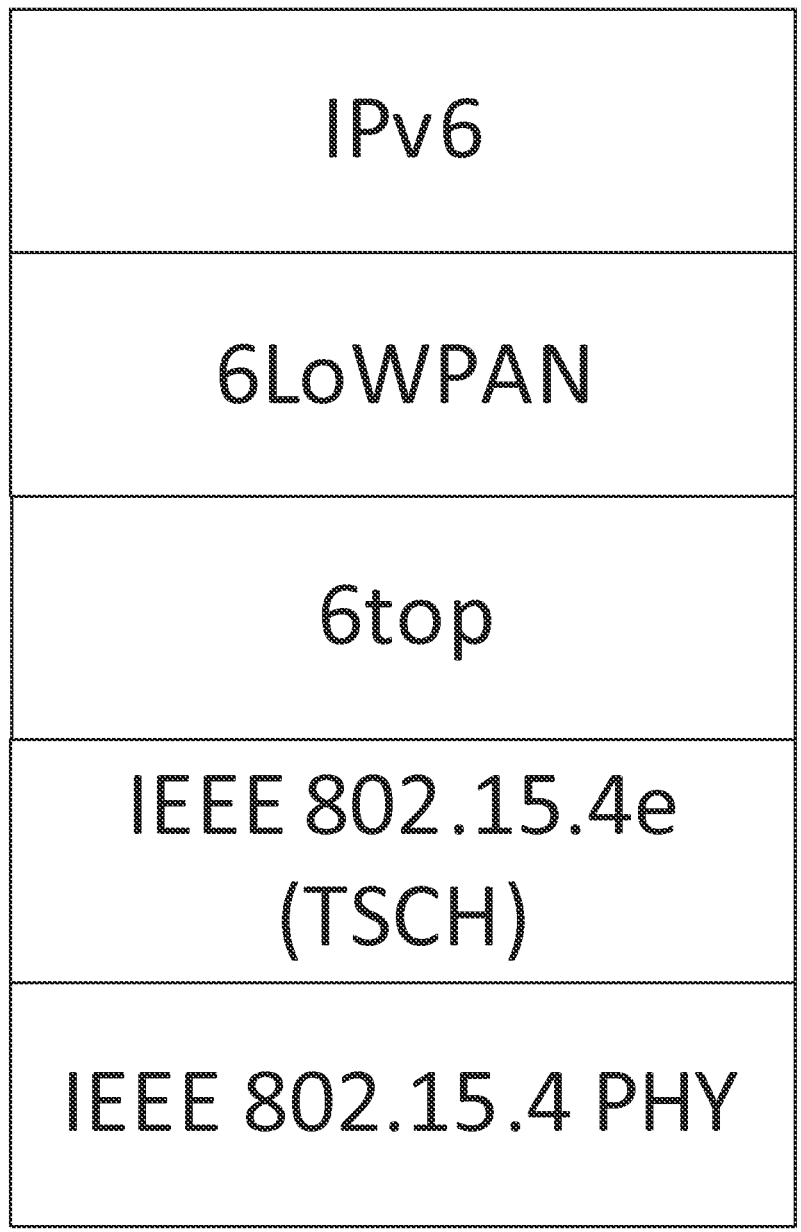
FIG. 1 illustrates a 6TiSCH operation sublayer in a 6TiSCH protocol stack according to an embodiment of the application.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

According to the application, a novel functionality, e.g., a path computation element (PCE) proxy is employed on one or more Backbone routers in a 6TiSCH network. The PCE proxy helps facilitate communications among LLN devices and a path computation element (PCE). Namely, a PCE Proxy on a Backbone router can utilize existing path communication element communication protocols (PCEP) to interface with the PCE located inside or outside of the 6TiSCH network. Moreover, Backbone routers are configured to communicate with LLN devices using network layer protocols, e.g., internet control messaging protocols (ICMPs).

In one embodiment, the PCE Proxy on the Backbone router is configured to aggregate TSCH Schedule report messages and Track Allocation Request messages orientated by LLN devices. In another embodiment, the PCE Proxy on the Backbone router helps the PCE to efficiently reserve a Track between source and destination. In yet another embodiment, the PCE Proxy present on each of plural Backbone routers cooperates among one another to efficiently configure a Track between a source and a destination. The Track may be a determined sequence of cells along a multi-hop path. Generally, it is the result of a reservation.

According to even another embodiment, the 6TiSCH network employs additional architecture, such as for example, a cell schedule database in communication with a PCE, to store the TSCH Schedule reported from one or more LLN devices.

In an embodiment of the application, the 6TiSCH control messages used within 6TiSCH networks may be carried by ICMP messages. The control messages may be between PCE Proxy on the Backbone routers and LLN devices and/or other PCE Proxies on Backbone routers. 6TiSCH control messages between the PCE Proxy on the Backbone router and LLN devices may include, for example, a TSCH Schedule Report Message, a Track Allocation Request Message, a Track Allocation Reply Message, a Track Assignment Message, and a Track Assignment Confirmation Message. Meanwhile, 6TiSCH control messages between the PCE proxy on the Backbone routers may include, for example, a Track Forward Request Message, a Track Forward Reply Message, a Track Forward Assignment Message, and a Track Forward Assignment Confirmation Message.

Generally, the 6TiSCH control message is an ICMPv6 information message with a Type of 159. Generally, the above-mentioned 6TiSCH control messages include an ICMPv6 header followed by a message body. A code field may further identify the specific type of 6TiSCH control message. For example, the code field may be run from '0x01' through '0x09' and be associated with each of the above-identified 6TiSCH control messages.

Further, control message used between the PCE and the PCE proxy on the Backbone routers may be carried via PCEP messages. These control messages may include, for example, an Aggregated TSCH Schedule Report Message, a Track Computation Request Message, a Track Computation Reply Message, a Track Forward Assignment Message, and a Track Forward Assignment Confirmation Message. Each of the above-noted PCEP control message types may have a predetermined value.

TSCH Mode of IEEE 82.15.4e

Time Slotted Channel Hopping (TSCH) is one of the medium access modes specified in IEEE 802.15.4e. The following properties exist in the TSCH mode of IEEE 802.15.4e: (i) time is divided into several Timeslots; (ii) timeslots are grouped into one or more Slot frames; and (iii) a Slot frame continuously repeats over time. For instance, Table 1 shows a TSCH Schedule. The x-axis is the Timeslot offset and the y-axis is the Channel Offset. Accordingly, a LLN device may use different channels in different Timeslots. A single element in the TSCH Slot frame, named as a "Cell", is identified by a Timeslot Offset value and a Channel Offset value. Typically, a given cell may be a scheduled cell, e.g., Tx, Rx, or TxRx, or an unscheduled cell as shown in Table 1. Moreover, a "Hard cell" is a scheduled cell that is configured by a centralized controller in the network meaning the cell cannot be further configured and/or modified by the LLN device itself. Alternatively, a "Soft cell" is a scheduled cell that is only configured by the LLN device itself and can be further configured by either the LLN device or by the centralized controller. However, once a soft cell is configured by the centralized controller, it will become a hard cell.

In order to receive or transmit packets, a LLN device needs to obtain a Schedule. Primarily, the LLN device may transmit a packet at Timeslot 0 using Channel 0. Next, the LLN device turns on its radio to receive an incoming packet at Timeslot 1 over Channel 1. The LLN device may transmit or receive a packet simultaneously at Timeslot 2 using Channel 15. The LLN device may turn off its radio in an unscheduled cell at Timeslot 99.

TABLE 1

| Offset | Timeslot | | | | |
|---|---|---|---|---|---|
| Channel Offset | 0 | 1 | 2 | ... | 99 |
| 0 | Tx | | | | Unscheduled |
| 1 | | Rx | | | Unscheduled |
| ... | | | | | Unscheduled |
| 15 | | | TxRx | | Unscheduled |

6TiSCH Network Architecture

A 6TiSCH network architecture generally includes a plurality of constrained devices that use TSCH mode of 802.15.4e as a Medium Access Control (MAC) protocol. The IETF 6TiSCH Working Group specifies protocols for addressing network layer issues of 6TiSCH networks. To manage a TSCH Schedule, a 6TiSCH Operation Sublayer (6top) is employed in a 6TiSCH Working Group. As shown in FIG. 1, 6top is a sublayer which is the next-higher layer for IEEE 802.15.4e TSCH MAC. 6top offers both management and data interfaces to an upper layer. For example, 6top offers commands such as READ/CREATE/UPDATE/DELETE to modify its resource, e.g., TSCH Schedule.

A 6TiSCH network may be managed by a PCE. The PCE has the capability of calculating not only the routing path between a source and a destination but also configuring the TSCH Schedule for one or more LLN devices on the path in a centralized way. The PCE can be located on the Backbone Router or alternatively, be located outside of the 6TiSCH network.

A PCEP message may include a common header followed by a variable length body. The common header of a PCEP message includes a Ver (Version) [0-2], flags [3-7]; message types [8-15]; and a message length [16-31] wherein the numbers represent the bit offset. Thus, the Ver includes 3 bits, the flag includes 5 bits, and the message type includes 8 bits. The message length includes 16 bits and is the total length of the PCEP message including common headers in bytes.

In one embodiment, before a path computation client (PCC), such as the Backbone router, may send a Path Computation Request, it needs to complete the following procedures. First, the PCC needs to establish a TCP connection (3-way handshake) with the PCE. Second the PCC needs to establish a PCEP session over the TCP connection. Third, the PCC needs to periodically send keep-alive messages to maintain the PCEP session. PCCs or Backbone routers are powerful devices that are located at the border of a 6TiSCH network. The Backbone routers work as a Gateway to connect the 6TiSCH network to the Internet.

The Path Computation Request contains a variety of objects that specify the set of constraints and attributes for the path to be computed. For example, a Path Computation Request may contain information such as a source IP Address, destination IP address and bandwidth. After receiving the Path Computation Request, the PCE will try to find a path for the PCC. Then the PCE will reply via a Path Computation Response Message. If the request can be satisfied, the Path Computation Response Message contains a set of computed Multiprotocol Label Switching (MPLS) paths that include each hop on the path. If the request cannot be satisfied, the Path Computation Response Message contains a reason why no path could be found.

With respect to LLN devices, they have constrained resources, e.g., limited power supply, memory, and processing capability. They connect to one or more Backbone routers via single hop or multi-hop communications. Due to their limited resources, LLN devices may not be able to support complicated protocols such as Transmission Control Protocol (TCP).

LLN devices can support network layer protocols such as ICMP protocol. Internet Control Message Protocol version 6 (ICMPv6) is used by hosts and routers to communicate network-layer information to each other. ICMP messages are carried inside Internet protocol (IP) datagrams. ICMP messages are sent using the basic IP header. Each ICMP message contains three fields that define its purpose and provides a checksum. They are Type, Code, and Checksum fields. The Type field identifies the ICMP message. The Code field provides further information about the associated Type field. The Checksum provides a method for determining the integrity of the message. Any field labeled "unused" is reserved for later extensions and must be zero when sent. However, receivers should not use these fields (except to include them in the checksum). The Type (numbers of 159-199) is unassigned.

Moreover, LLN devices may function as constrained IP routers. In particular, a LLN device may not have the ability to compute the routing table to all LLN devices. Nevertheless, it can forward a packet based on the routing table pre-configured by other entities located inside or outside of 6TiSCH network.

Figure 2:
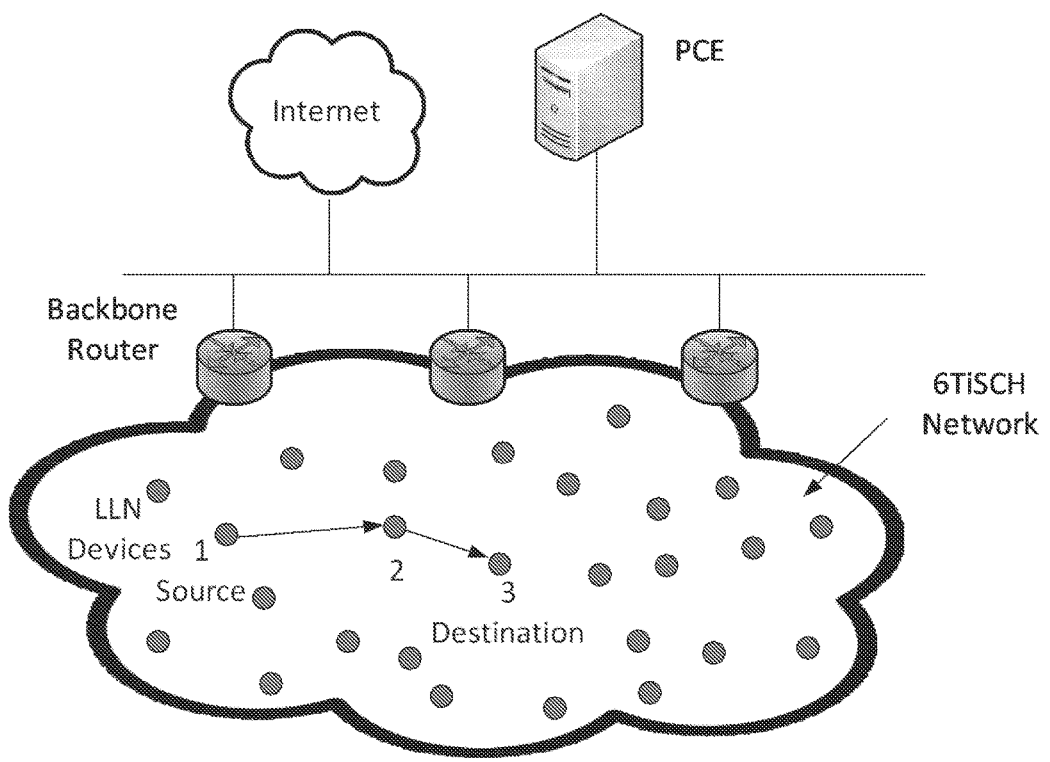
FIG. 2 illustrates architecture of a 6TiSCH network according to an embodiment of the application.

The TSCH Schedule of LLN devices can also be configured on a router as shown in FIG. 2. As illustrated, the schedule is mapped from the source at LLN device 1 to the destination at LLN device 3. The LLN devices are denoted by a circle in the 6TiSCH network. A Track can be reserved by the PCE to enhance the multi-hop communications between the source and the destination. According to the application, a LLN device on the Track knows not only what cells it should use to receive packets from its previous hop but also knows what cells it should use to send packets to in its next hop. By using the Track, throughput and delay of the path between the source and the destination can reasonably be guaranteed. This is important for industrial automation and process control.

6TiSCH Networks Use Case

Figure 3:
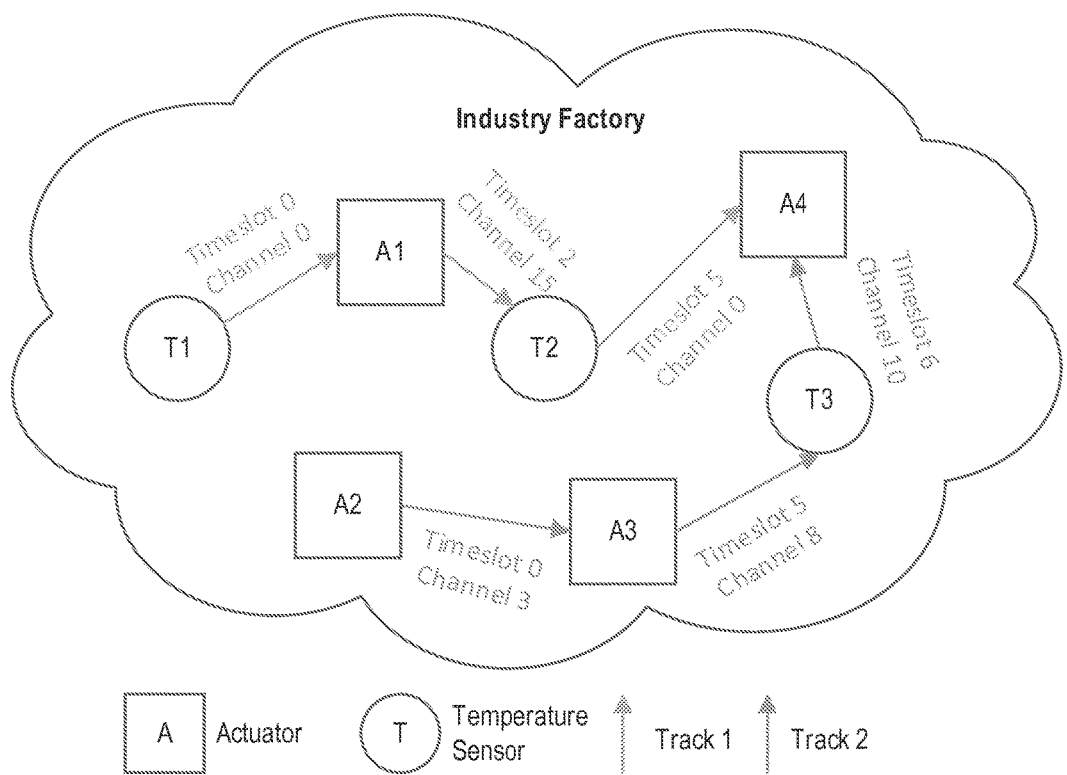
FIG. 3 illustrates an embodiment of an industrial automation and process control in low-power and lossy networks.

As illustrated in FIG. 3, 6TiSCH network for industrial automation and process control is provided with multi-hop communications. In this figure, sensors and actuators are LLN devices. For example, when the Temperature Sensor 1 "T1" in the network senses an event, it will send a signaling packet to Actuator 4 "A4" to trigger several actions. Also, in an automation assembly line, when Actuator 2 "A2" finishes a task, it will send a signaling packet to Actuator 4 "A4" to trigger the next action in the automation assembly line. The throughput and delay of these packets are extremely important for the industrial automation and process control. Thus, a Track is reserved between the source and the destination in order to deliver these important signaling packets on time.

General Architecture

Figure 4A:
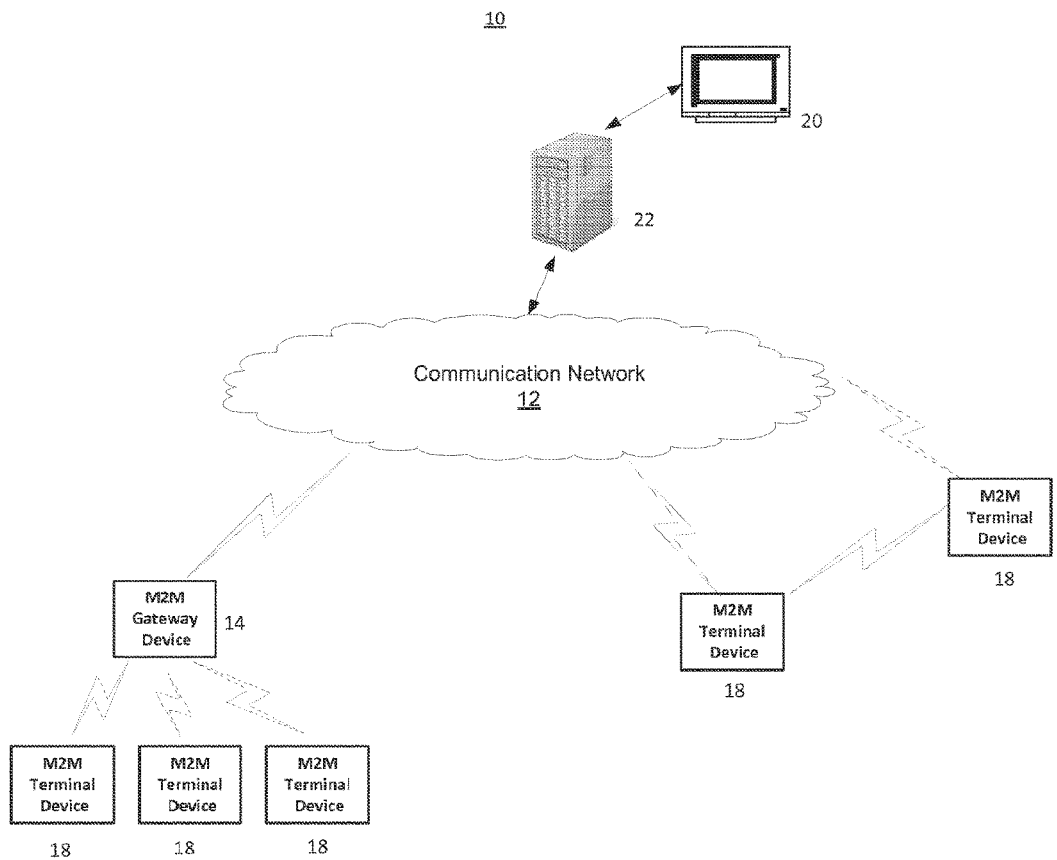
FIG. 4A illustrates an embodiment of a machine-to machine (M2M) or IoT communication system.

FIG. 4A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 4A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 4A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14, such as a Backbone router with a proxy, and terminal devices 18, such as LLN Devices. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. In one embodiment, the service layer 22 may be a PCE. M2M devices 18 and gateways 14 may communicate via various networks including, cellular, WLAN, WPAN, e.g., Zigbee, 6LoWPAN, Bluetooth, direct radio link, and wireline for example.

Figure 4B:
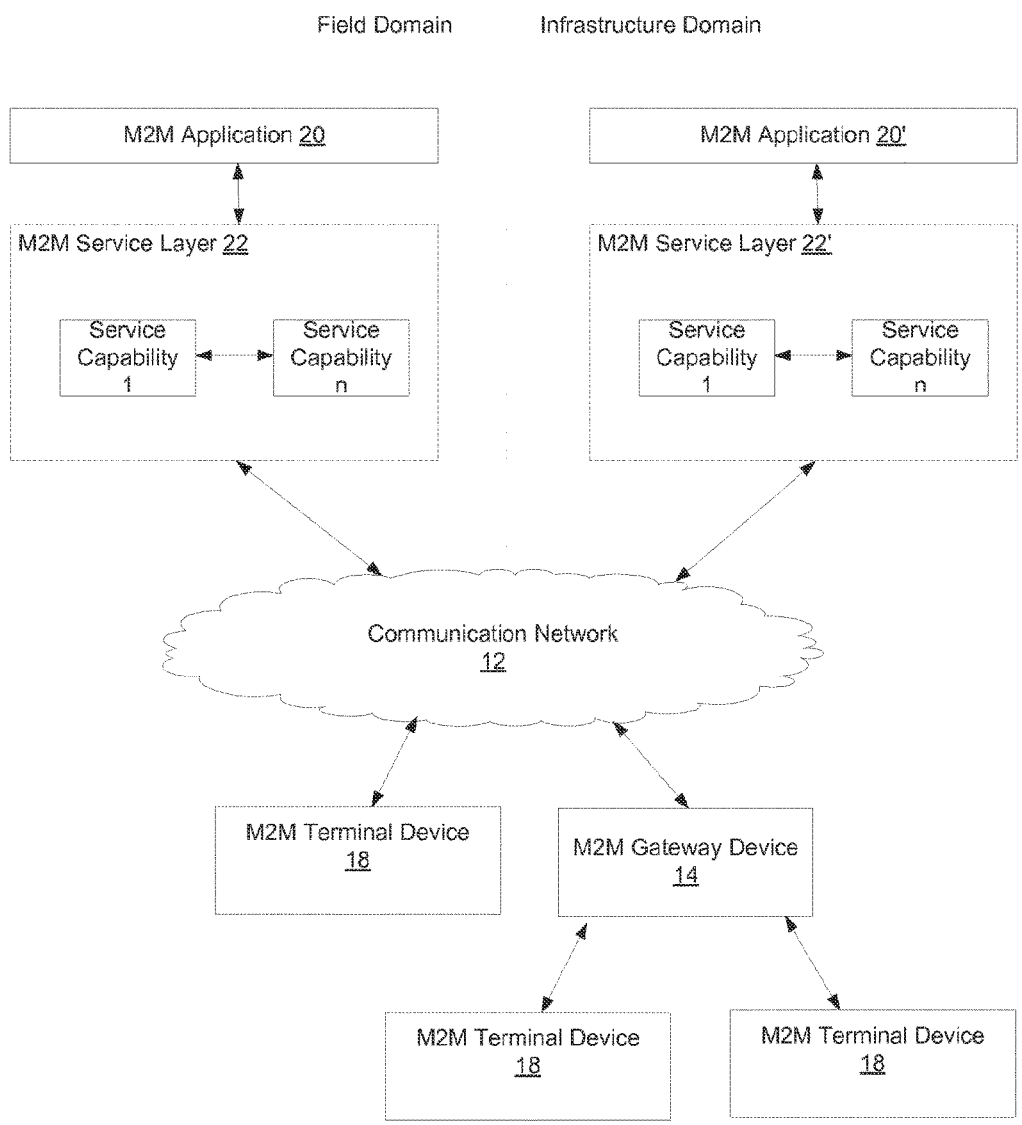
FIG. 4B illustrates an embodiment of the application of a M2M service platform.

Referring to FIG. 4B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways.

For example, the M2M service layer 22 could be implemented in a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 4B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset Tracking, and security and surveillance. As mentioned above, the M2M service layer, running across the devices, gateways, and other servers of the system, supports functions such as, for example, data collection, device management, security, billing, location Tracking/geo-fencing, device/service discovery, and legacy systems integration, and provides these functions as services to the M2M applications 20 and 20'. Moreover, the M2M service layer may also be configured to interface with other devices such as LLN devices, Backbone routers and PCEs as discussed in this application and illustrated in the figures.

The method of reserving a Track as discussed in the present application may be implemented as part of a service layer. The service layer is a software middleware layer that supports value-added service capabilities through a set of Application Programming Interfaces (APIs) and underlying networking interfaces. Both ETSI M2M and oneM2M use a service layer that may contain this method of reserving a Track. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs), e.g., service capabilities. An instantiation of a set of one or more particular types of CSFs is referred to as a Common Services Entity (CSE) which can be hosted on different types of network nodes, e.g., infrastructure node, middle node, application-specific node. Further, the method of reserving a Track as described in the present application can be implemented as part of an M2M network that uses a Service Oriented Architecture (SOA) and/or a resource-oriented architecture (ROA) to access services such as the reserving a Track according to the present application.

Figure 4C:
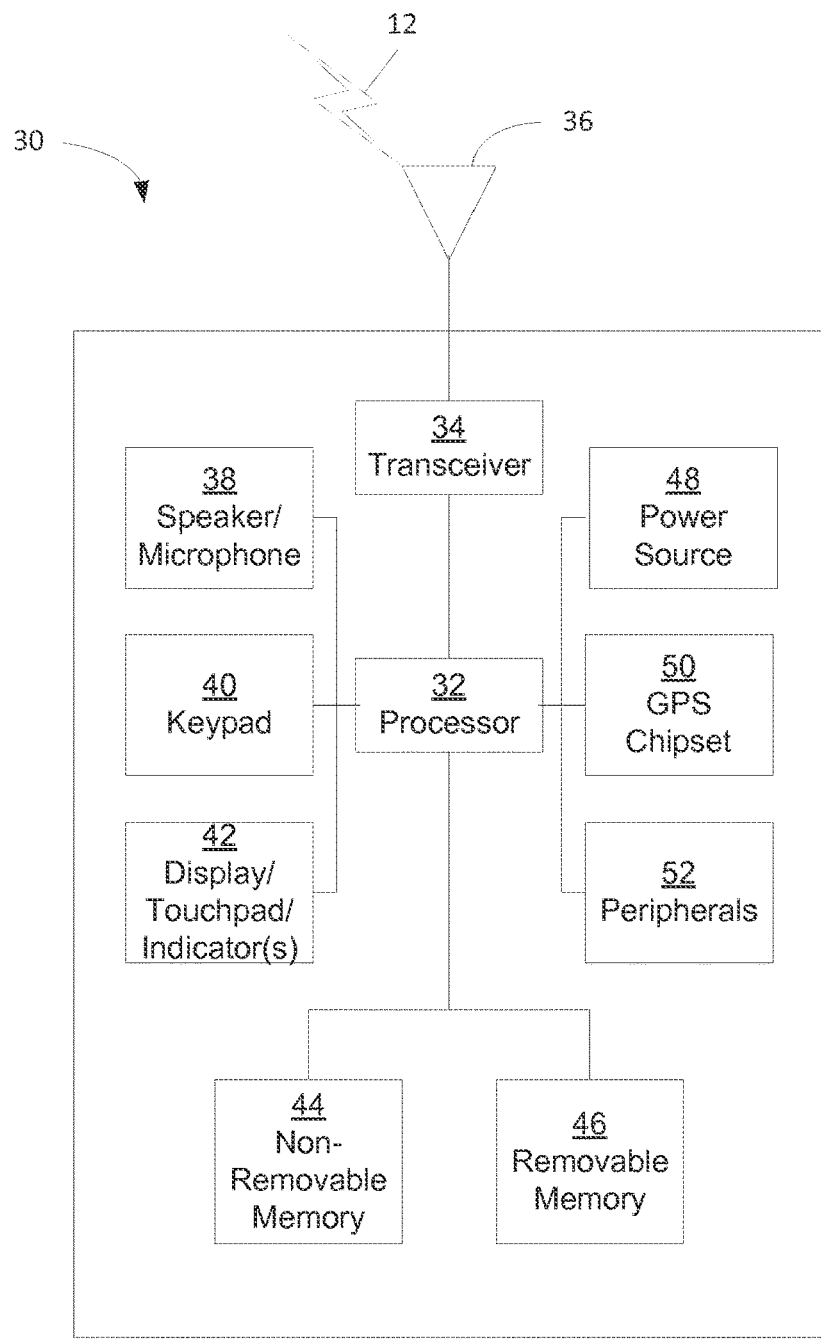
FIG. 4C illustrates an embodiment of the application of a system diagram of an example M2M device.

FIG. 4C is a system diagram of an example M2M device 30, such as a M2M terminal device 18 or an M2M gateway device 14 for example. As shown in FIG. 4C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed systems and methods for embedded semantics naming of sensory data. The M2M device 30 may also be employed with other devices, including fore example LLN devices, Backbone routers and PCEs as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 4C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 4C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 4D:
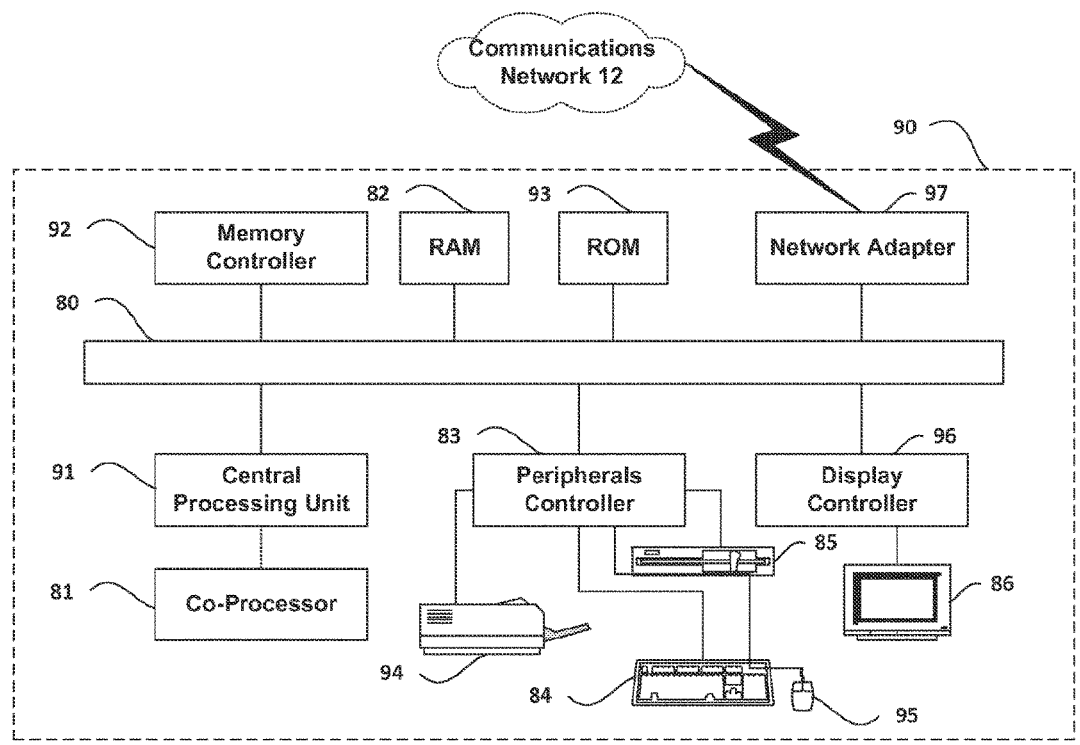
FIG. 4D illustrates an embodiment of the application of a block diagram of an exemplary computing system.

FIG. 4D is a block diagram of an exemplary computing system 90 on which, for example, the M2M service platform 22 of FIG. 4A and FIG. 4B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 4A and FIG. 4B.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

Techniques for Reserving a Track

Figure 5:
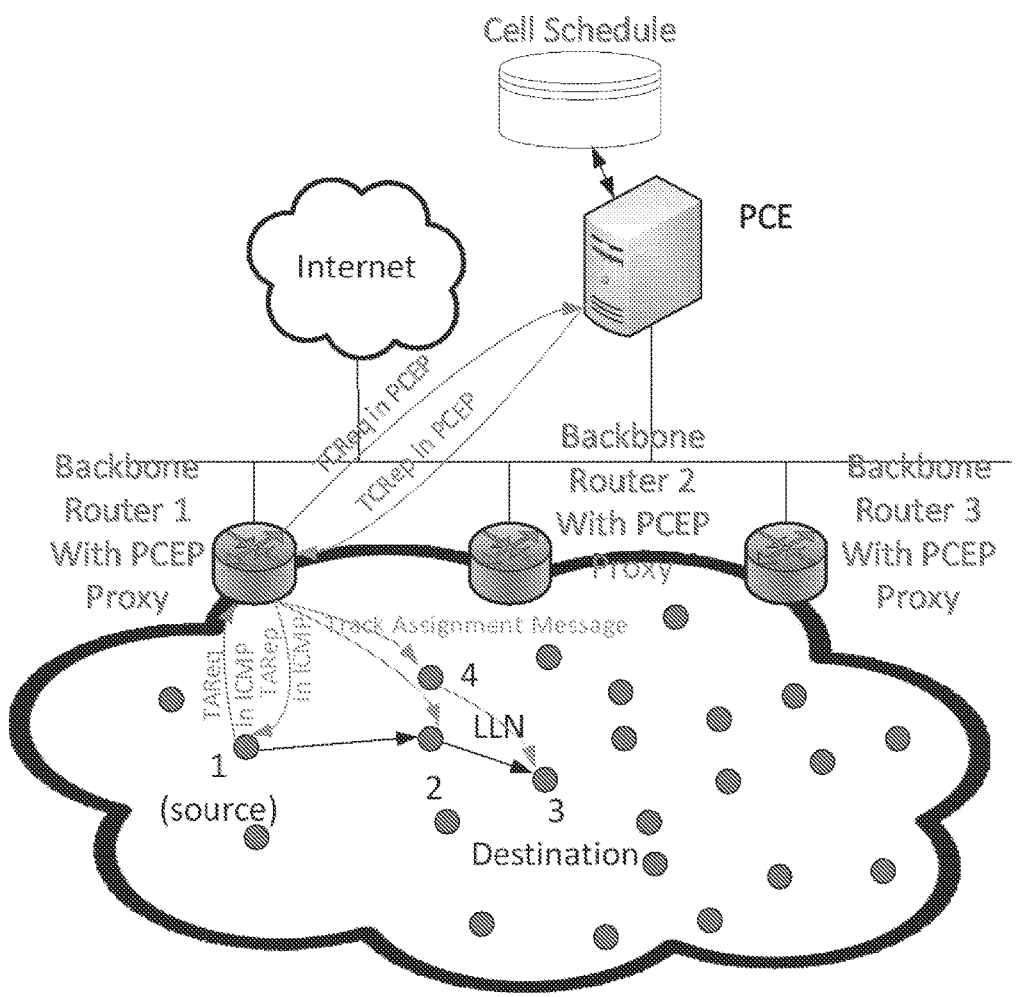
FIG. 5 illustrates a Backbone router assisted Track allocation/reservation architecture according to an embodiment of the application.

According to an aspect of the application, a technique is disclosed for a LLN device to reserve a Track in the 6TiSCH network. As illustrated in FIG. 5, a source LLN device requests allocation of a Track to the destination using a Backbone router. The PCE Proxy on the Backbone router assists the PCE to configure the TSCH Schedule of LLN devices located on the Track. According to an embodiment, the PCE sends one response message to a Backbone router instead of multiple messages to configure a Track between the source and the destination. For example, the PCE in FIG. 5 receives a Track request in PCEP from Backbone router 1 having a PCEP proxy. In turn, the PCE sends a Track response in PCEP to Backbone router 1 having a PCEP proxy. According to this technique whereby requests received by the PCE are limited in frequency may reduce the overall workload of the PCE.

Figure 6:
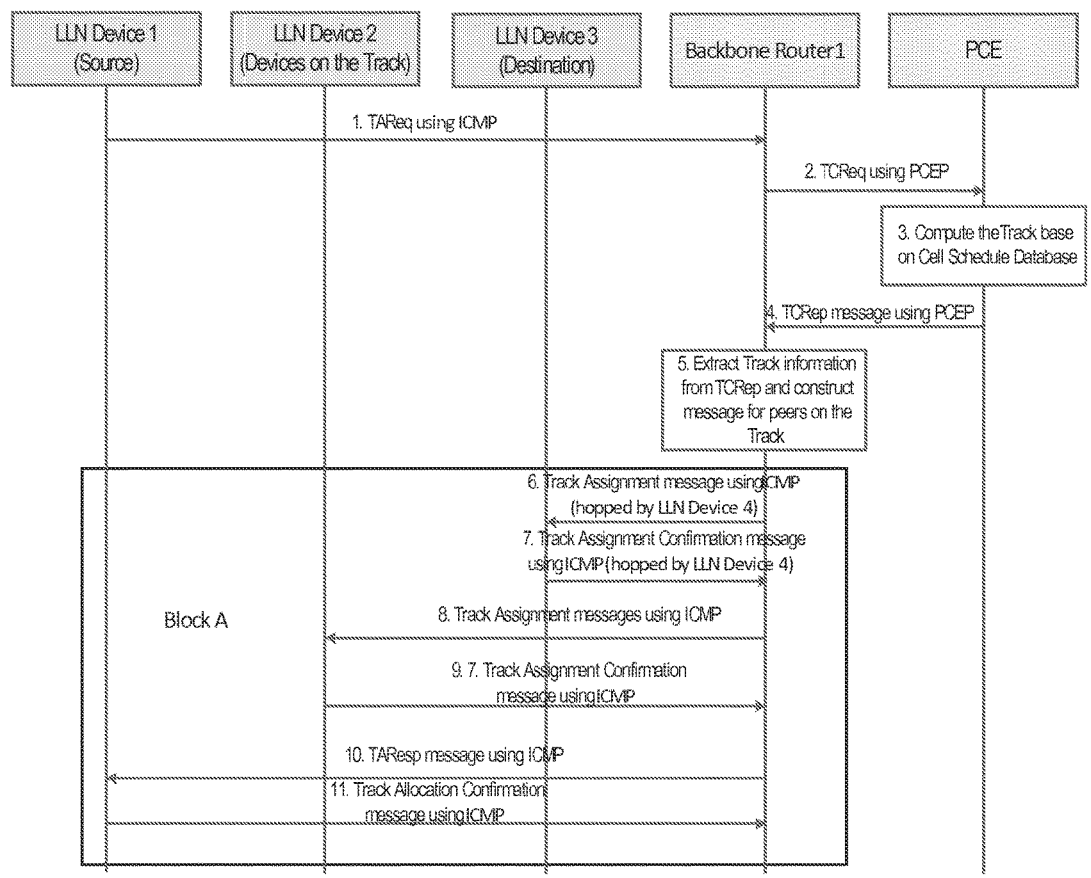
FIG. 6 illustrates a technique for a Backbone router assisted Track reservation procedure according to an embodiment of the application.

According to another embodiment, a call flow detailing the reservation procedure of a Backbone router is described. Namely, as illustrated in FIG. 6, a source LLN device sends a Track Allocation Request (TAReq) to the PCE Proxy located on Backbone router 1 using ICMP protocol (Step 1). Each step of the procedure is denoted by a roman numeral in FIG. 6. A TAReq may include but is not limited to the fields listed in Table 2 below.

TABLE 2

| Field name | Description |
| --- | --- |
| Source address | The IP address of the LLN device at the front of the Track |
| Destination address | The IP address of the LLN device at the end of the Track |
| Request length | Number of timeslots requested to reserve for the Track. |
| Queuing Preference (optional) | Indicate whether this Track Computation Request (TCReq) can be queued by the PCE proxy. The Queuing Preference is set to true if the TCReq can be queued at the PCE Proxy on the Backbone router and is set to false otherwise. |

According to Step 2, the PCE Proxy on Backbone router 1 extracts the TAReq, and sends a TCReq to the PCE using PCEP protocol. A TCReq may include but is not limited to the fields listed in Table 3 below.

TABLE 3

| Field Name | Description |
| --- | --- |
| Proxy address | The IP address of the router that send the TCReq |
| TAReq | Information of the first TAReq as listed in Table 2 |

Next, the PCE will check a Cell Schedule Database located remotely or within it (Step 3). Here, the PCE will the check the Cell Schedule Database to calculate an optimal Track from the source LLN device to the destination LLN device. Next, the PCE will send a Track Computation Reply (TCRep) message to the PCE Proxy on Backbone Router 1 using PCEP protocol (Step 4). The TCRep includes but is not limited to the fields listed in Table 4 below. According to Table 4, the Field names other than "Result of the Request," are valid only if the value of "Result of the Request" is true.

TABLE 4

| Field Name | Description |
| --- | --- |
| Result of the Request | The result of the Track computation process. The value is true if the PCE find a Track for the request, and is false otherwise. |
| Track ID | The ID of the Track assigned by the PCE |
| Address of the $1^{st}$ LLN device (source LLN device) on the Track | The IP address of the $1^{st}$ LLN device on the Track |
| Link info for the $1^{st}$ hop | Information of the cells (Timeslot Offset and Channel Offset) that are used for communications between the transmitter and the receiver of the link. |
| Address of the $2^{nd}$ and subsequent LLN Device on the Track | The IP address of the $2^{nd}$ and subsequent LLN devices on the Track |
| Link info for the $2^{nd}$ and subsequent hops | Information of the cells (Timeslot Offset and Channel Offset) that are used for communications between the transmitter and the receiver of the link. |

According to Step 5, the PCE Proxy on Backbone router 1 extracts Track information from TCRep and constructs a Track Assignment Message for peers on the Track. Next, Track Assignment Messages are sent to all LLN devices on the designated Track. As shown in FIG. 6, LLN devices 2 and 3 are notified via ICMP protocol and to wait for further instructions (steps 6 and 8). Moreover, a Track Assignment Message may be hopped by other LLN devices. For example, FIG. 5 illustrates messages that are hopped from Backbone router 1 to LLN device 4, e.g., off-Track, in order to reach LLN device 3 located on the Track. A Track Assignment Message may include but is not limited to the fields listed in Table 5 below.

TABLE 5

| Field Name | Description |
| --- | --- |
| Track ID | The ID of the Track |
| Device address | The IP address of the LLN device to be configured. |
| Income Cells information | The Timeslot Offset, Channel Offset of cells that are used to receive packets from previous hop. |
| Outgoing Cells information | The Timeslot Offset, Channel Offset of cells that are used to send packets to the next hop. |

Next, LLN devices 2 and 3 will send Track Assignment Confirmation messages, respectively, to the PCE Proxy on Backbone Router 1 using ICMP protocol (Steps 7 and 9). After receiving Track Assignment confirmation from all LLN devices on the Track, a Track Allocation Reply Message is sent from the Backbone Router 1 to the source LLN device 1 using ICMP protocol. A Track Allocation Reply Message contains but is not limited to fields listed in Table 6 below. Lastly, the source LLN device, e.g., LLN Device 1, will send a Track Allocation Confirmation Message back to the PCE Proxy on Backbone Router 1 using ICMP protocol.

TABLE 6

| Field Name | Description |
| --- | --- |
| Track ID | The ID of the Track |
| Source address | The IP address of the source LLN device on the Track |
| Destination address | The IP address of the destination LLN device on the Track |
| Outgoing Cells | The Timeslot Offset, Channel Offset of Cells that is used to send packets to the next hop. |

Figure 7:
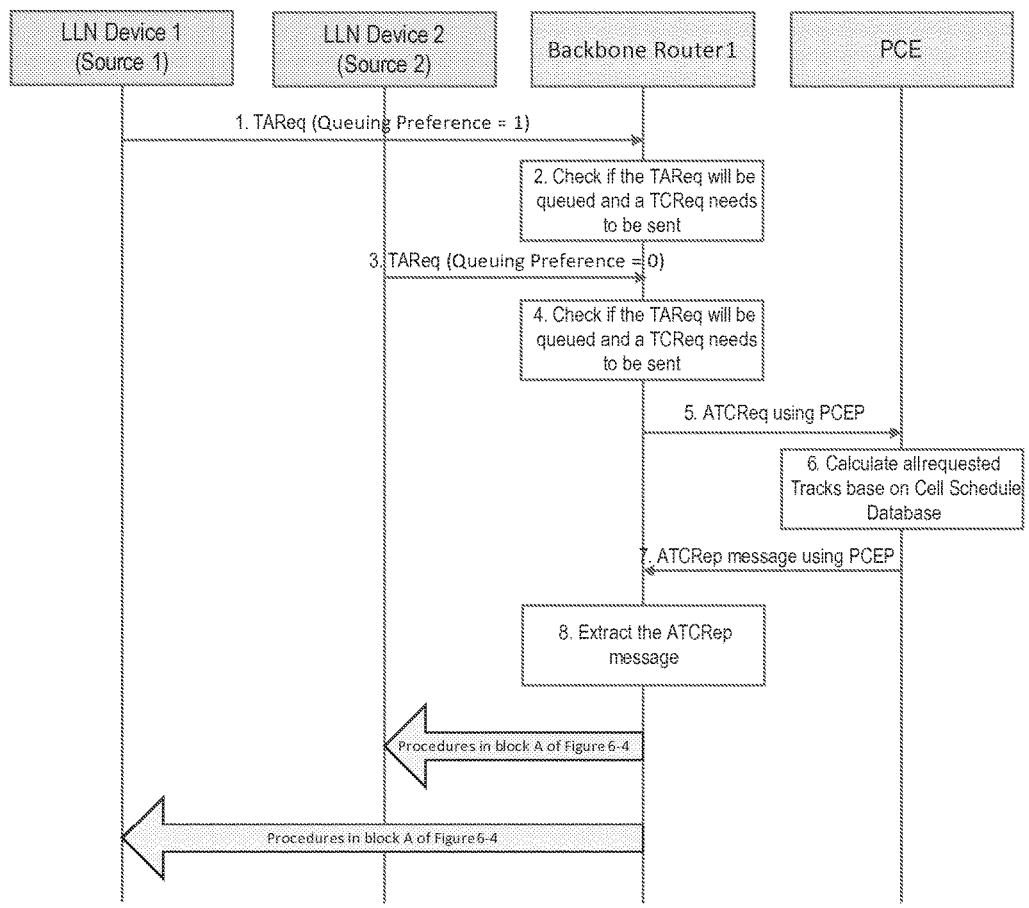
FIG. 7 illustrates technique for a Backbone router assisted Track reservation procedure according to another embodiment of the application.

According to another embodiment, a technique is described whereby the Backbone router queues TAReq messages received from LLN devices and sends an Aggregated Track Computation Request (ATCReq) containing one or more TAReq messages. By so doing the number of TCReq packets sent to, and thus arriving at, the PCE is ultimately reduced. In particular, FIG. 7 illustrates a call flow of this embodiment. Each step is denoted by a roman numeral in FIG. 7.

According to Steps 1 and 3, a TAReq message is sent by each of source LLN Devices 1 and 2 to the Backbone router. Additional LLN devices may be employed as desired to one of ordinary skill in the art. Moreover, a queuing preference is provided for each source LLN device. The queuing preference in a TAReq message is set to "1" if the TAReq message is allowed be queued in the PCE Proxy on the Backbone router. Otherwise it is set to "0". For example, as shown in FIG. 7, LLN Device 1 has a preference of 1 while LLN Device 2 has a preference of 0.

The PCE Proxy on Backbone router 1 then checks the TAReq message and queuing preference thereof as received from each of the sources, LLN device 1 and LLN device 2 (Steps 2 and 4). The PCE Proxy on Backbone router 1 will push the TAReq message associated with the LLN device in the queue having the queuing preference of "1". This is the TAReq message from LLN Device 1. In Step 5, the PCE Proxy on Backbone router 1 sends an "Aggregated Track Computation Request" (ATCReq) message to the PCE using PCEP protocol. This may be done for the following cases: (i) the TAReq received from the LLN device cannot be queued, e.g., the queuing preference in the TAReq message is "0"; (ii) A number of TAReqs in the queue reaches the maximums limit; and (iii) a timeout occurs since the last time a TCReq message was sent. In another embodiment, the PCE Proxy on the Backbone router 1 sends the TCReq message that contains all TAReq messages stored in the queue to the PCE as listed in Table 7 below.

TABLE 7

| Field Name | Description |
| --- | --- |
| Proxy address | The IP address of the router that send the TCReq |
| Number of Request | Number of TAReq, N, contained in the TCReq |
| TAReq 1 | Information of the first TAReq as listed in Table 2 |
| TAReq N | Information of the second and subsequent TAReqs as listed in Table 2 |

Next, after the PCE receives the ATCReq message, the PCE will check the Cell Schedule Database to calculate all requested Tracks in the TCReq message (Step 6). As provided for in FIG. 7, the PCE sends an Aggregated Track Computation Reply (ATCRep) message to the PCE Proxy on Backbone router 1 using PCEP protocol (Step 7). An ATCRep message contains one or more TCRep messages as listed in Table 4. Next, the PCE Proxy on Backbone router 1 extracts each TCRep message received from the ATCRep message. It then follows the same procedures to configure each Track in the ATCRep message (Step 8). According to one embodiment, the protocols discussed in Steps 6-11 in FIG. 6, referenced as "Block A," may be employed in FIG. 7 between Backbone router 1 and each of source LLN Devices 1 and 2.

Figure 8:
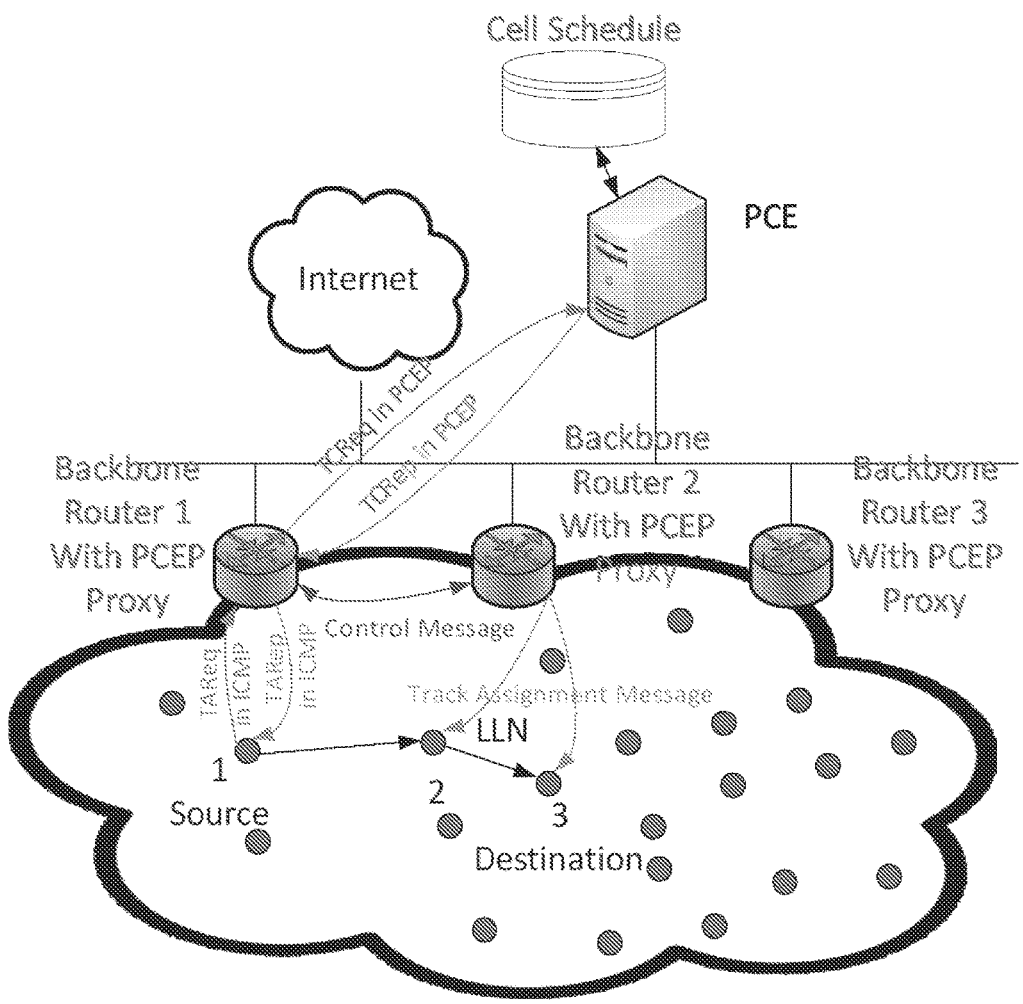
FIG. 8 illustrates a Backbone router assisted Track allocation/reservation architecture according to another embodiment of the application.

According to even another embodiment of the application, a technique for cooperating between plural Backbone routers for facilitating a Track reservation is described. As illustrated in FIG. 8, the Backbone router negotiates and cooperates with other Backbone routers in the network to facilitate the Track assignment. The primary Backbone router may do so by identifying another Backbone router that is located closer to the LLN device(s). By so doing, some of the heavy workload handled by the Backbone router, e.g., Backbone router 1, may be alleviated. Instead, it is distributed among many Backbone routers. Preferably each LLN device in the Track is configured by the Backbone router that is located closest to it. This may be practical when the Track is too long. Intuitively, it takes a longer time for the Backbone router to configure a LLN device that is located further away. This will help reduce the time necessary to allocate a Track.

Figure 9:
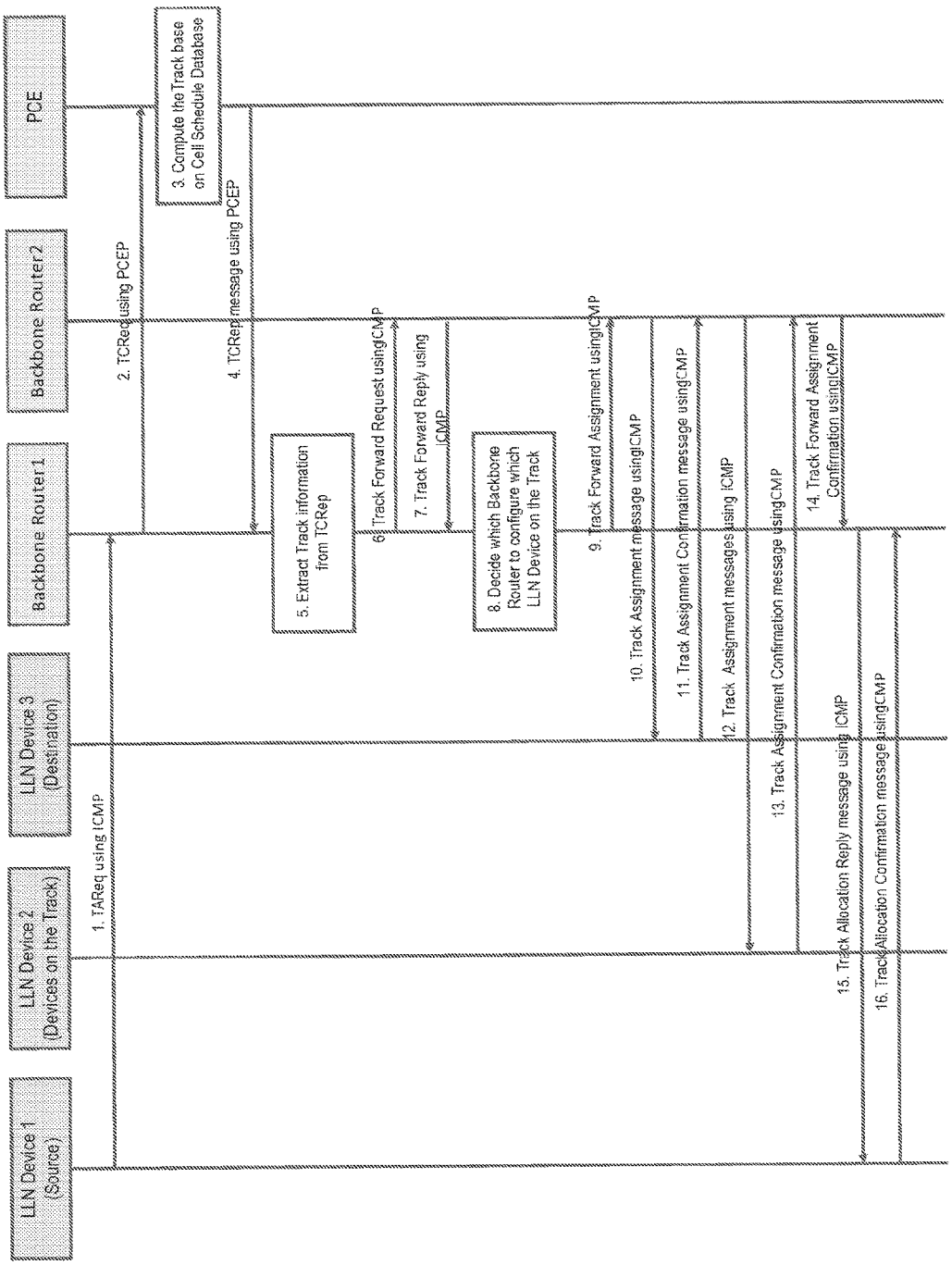
FIG. 9 illustrates a technique for a Backbone router assisted Track reservation procedure according to FIG. 8.

According to another embodiment as shown for example in FIG. 9, a LLN Device 1, e.g., source, sends a TAReq to the PCE Proxy located on Backbone router 1 using ICMP protocol (Step 1). Each step of the procedure is denoted by a roman numeral in FIG. 9. According to Step 2, the PCE Proxy on Backbone router 1 extracts the TAReq, and sends a TCReq to the PCE using PCEP protocol. Next, the PCE will check a Cell Schedule Database located remotely or within it (Step 3). Here, the PCE will the check the Cell Schedule Database to calculate an optimal Track from the source LLN device to the destination LLN device. Next, the PCE will send a Track Computation Reply (TCRep) message to the PCE Proxy on Backbone router 1 using PCEP protocol (Step 4).

Next, the PCE Proxy on Backbone router 1 extracts Track information from TCRep (Step 5). Then, the PCE Proxy on Backbone router 1 sends a Track Forward Request to all other PCE Proxy Backbone routers in the network (Step 6). Generally, the PCE Proxy Backbone routers use ICMP protocol. By sending a Track Forward Request, the Backbone router 1 is able to find other Backbone routers that may cooperate to more efficiently finish the Track assignment process. As shown in FIG. 9, Backbone router 1 finds Backbone router 2 which is closer to LLN devices 2 and 3. The Track Forward Request message may include but is not limited to the fields listed in Table 8.

TABLE 8

| Field Name | Description |
| --- | --- |
| Requestor Address | The IP address of the Backbone Router that sends the message |
| Device ID List | The ID of all LLN devices that are on the Track. |

Next, the PCE Proxy on one or more of the Backbone routers, e.g., Backbone router 2 that receives the Track Forward Request sends Track Forward Reply Messages back to Backbone router 1 using ICMP protocol (Step 7). Namely, Backbone router 2 may notify Backbone router 1 of LLN devices on the Track that can be reached, such as for example, LLN devices 2 and 3. The PCE Proxy on Backbone router 1 then decides whether to configure the TSCH schedule of LLN devices 2 and 3 on the PCE Proxy on Backbone router 2 (Step 8). If the decision is 'Yes', the PCE Proxy on Backbone router 1 will send a Track Forward Assignment Request to the PCE Proxy on Backbone router 2 using ICMP protocol (Step 9) A Track Forward Assignment Request Message may include but is not limited to the fields listed in Table 9.

TABLE 9

| Field Name | Description |
| --- | --- |
| Proxy address | The IP address of the Backbone Router that receives the message |
| Track ID | The ID of the Track |
| Device number | Number of LLN devices, N, need to be configured by the PCE Proxy on the Backbone Router. |
| Device address 1 | The IP address of the LLN device to be configured. |
| Income Cells information of Device 1 | The Timeslot Offset, Channel Offset of cells that are used to receive packets from previous hop. |
| Outgoing Cells information of Device 1 | The Timeslot Offset, Channel Offset of cells that are used to send packets to the next hop. |
| Device address N | The IP address of the LLN device to be configured. |
| Income Cells information of Device N | The Timeslot Offset, Channel Offset of cells that are used to receive packets from previous hop. |
| Outgoing Cells information of Device N | The Timeslot Offset, Channel Offset of cells that are used to send packets to the next hop. |

After the PCE Proxy on Backbone router 2 receives a Track Forward Assignment Request from the PCE Proxy on Backbone router 1, the PCE Proxy on Backbone router 2 will send Track Assignment Messages to all LLN devices, such as for example, LLN devices 2 (device on the Track) and 3 (destination), that are located in the Track Forward Assignment Request using ICMP protocol (Steps 10 and 12). A Track Assignment Message includes but is not limited to the fields listed in Table 5 above.

The LLN devices, such as for example LLN devices 2 and 3, that receive the Track Assignment Message will send a Track Assignment Confirmation Message to PCE Proxy on Backbone router 2 using ICMP protocol (Steps 11 and 13). After receiving all Track Assignment Confirmations from LLN devices on the Track the PCE Proxy on Backbone router 2 may send a Track Forward Assignment Confirmation Message to the PCE Proxy on Backbone router 1 using ICMP protocol. Thereafter, the PCE Proxy on Backbone router 1 will send a Track Allocation Reply Message to the source LLN device using ICMP protocol (Step 15). A Track Allocation Reply Message may include but is not limited to the fields listed in Table 6 above. Further, the source LLN device may send a Track Allocation Confirmation Message to the PCE Proxy on Backbone router 1 using ICMP protocol.

According to yet another embodiment, a PCE assisted Track reservation procedure is disclosed. Namely, this technique may be employed, for example, when high control message overhead exists between Backbone routers. This technique may be further preferred in instances where there are many Backbone routers in the network.

Figure 10:
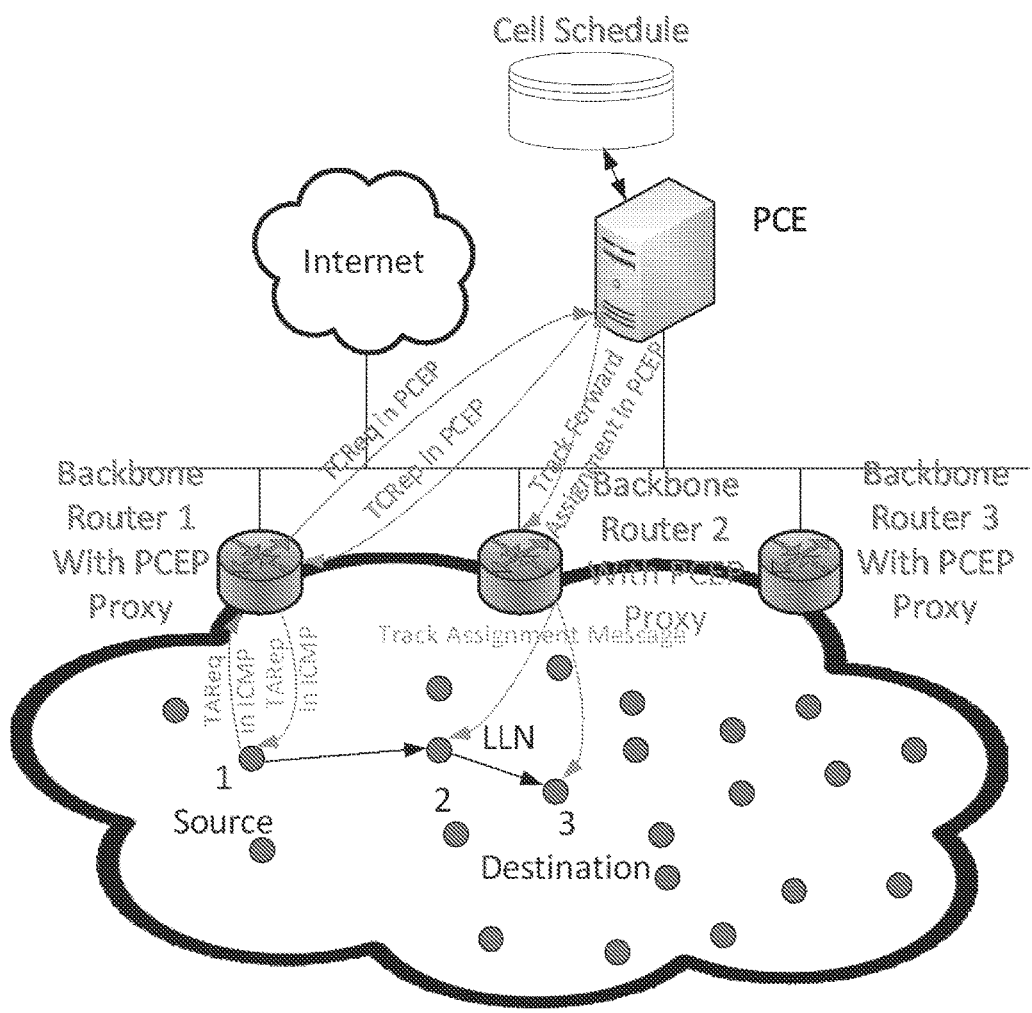
FIG. 10 illustrates a Backbone router assisted Track allocation/reservation architecture according to even another embodiment of the application.

As shown in FIG. 10, upon the PCE checking the Cell Schedule Database to compute the Track between the source and destination, it may determine the address of the PCE Proxy on the Backbone router that forwards the TSCH Schedule of LLN devices on the Track. Therefore, the PCE can send out Track Assignment Messages directly to the PCE Proxy on Backbone routers that are located closer to LLN devices on the Track. By so doing, negotiation due to overhead between Backbone routers may be reduced and/or even eliminated.

Figure 11:
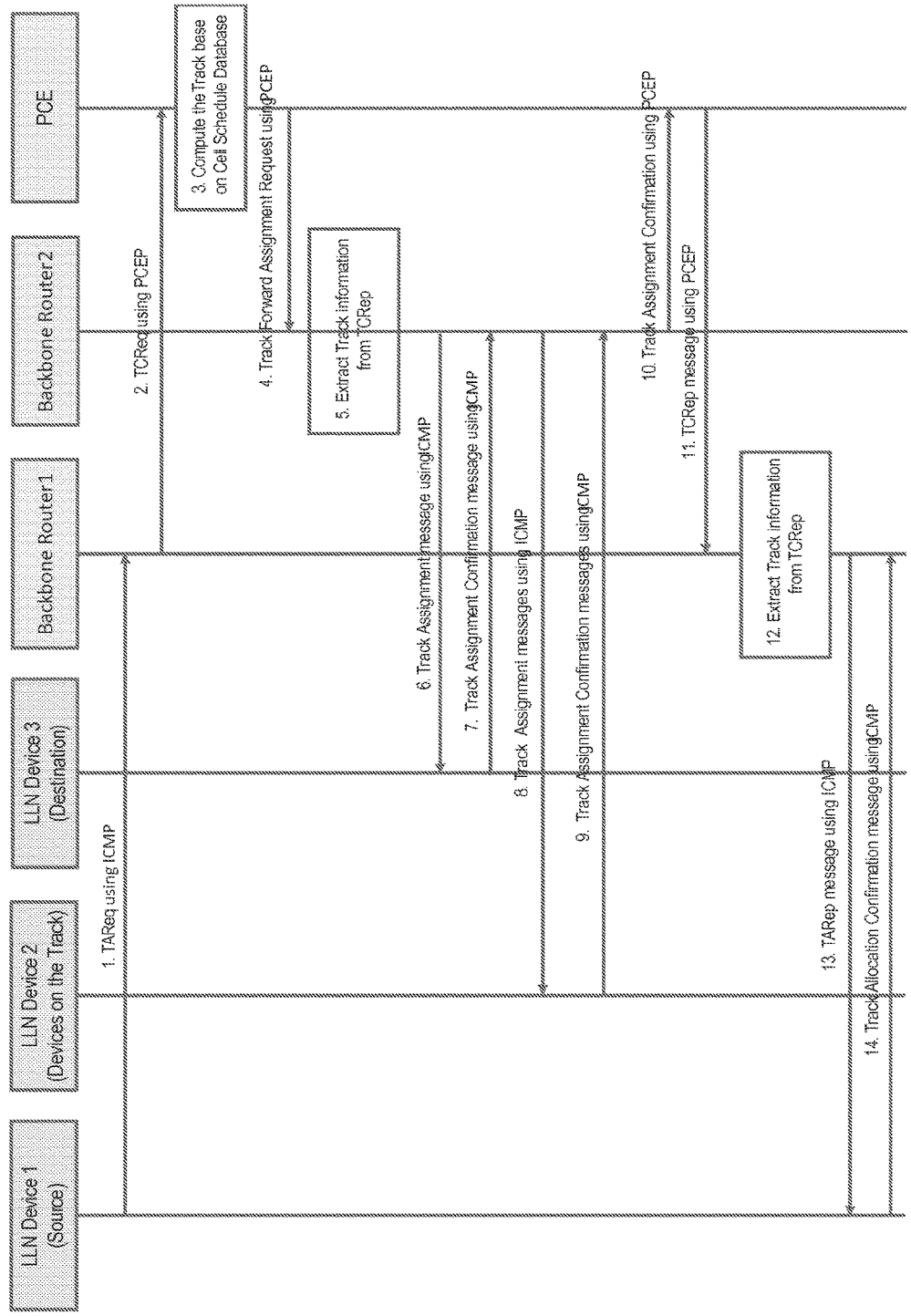
FIG. 11 illustrates a technique for a Backbone router assisted Track reservation procedure according to FIG. 10.

As illustrated in FIG. 11, a call flow of PCE assisted Track reservation procedure is provided. Each of the steps in FIG. 11 is denoted by a roman numeral. Steps 1-3 in FIG. 11 are similar to those referenced above in FIG. 6. Here, the PCE locates the PCE Proxy on Backbone routers that report the TSCH Schedule of each LLN device on the Track (Step 4). For example, Backbone router 2 is configured to report a TSCH Schedule of LLN devices 2 and 3. The PCE will send a Track Forward Assignment Request Message to the PCE Proxy on Backbone router 2 using PCEP protocol (Step 5). A Track Forward Assignment Request Message may include but is not limited to the fields listed in Table 9 above. The PCE Proxy on Backbone router 2 will then extract all LLN devices contained in the Track Forward Assignment Request, and construct Track Assignment Messages (Step 5).

The PCE Proxy on Backbone router 2 will then send Track Assignment Messages to LLN devices 2 and 3 using ICMP protocol and await their confirmations (Steps 6 and 8). A Track Assignment Message may include but is not limited to the fields listed in Table 5 disclosed above. The LLN devices 2 and 3 will send Track Assignment Confirmation Messages to the PCE Proxy on Backbone router 2 using ICMP protocol (Steps 7 and 9). After receiving all Track Assignment Confirmations from LLN devices on the Track, the PCE Proxy on Backbone router 2 will send a Track Assignment Confirmation Message to the PCE using PCEP protocol (Step 10). The PCE will then send a TCRep Message to the PCE Proxy on Backbone router 1 using PCEP protocol (Step 11). A TCRep may include but is not limited to the fields listed in Table 4 disclosed above.

The PCE Proxy on Backbone router 1 will then extract the LLN devices to be configured in the TCRep (Step 12). Next, the PCE Proxy on Backbone router 1 will send a Track Allocation Reply message to the source LLN device (Step 13). A Track Allocation Reply Message may include but is not limited to the fields listed in Table 6 disclosed above. Further, the source LLN device will send a Track Allocation Confirmation Message to the PCE Proxy on Backbone router 1 using ICMP protocol (Step 14).

Techniques for Reporting Information from A LLN Device to A PCE

Figure 12:
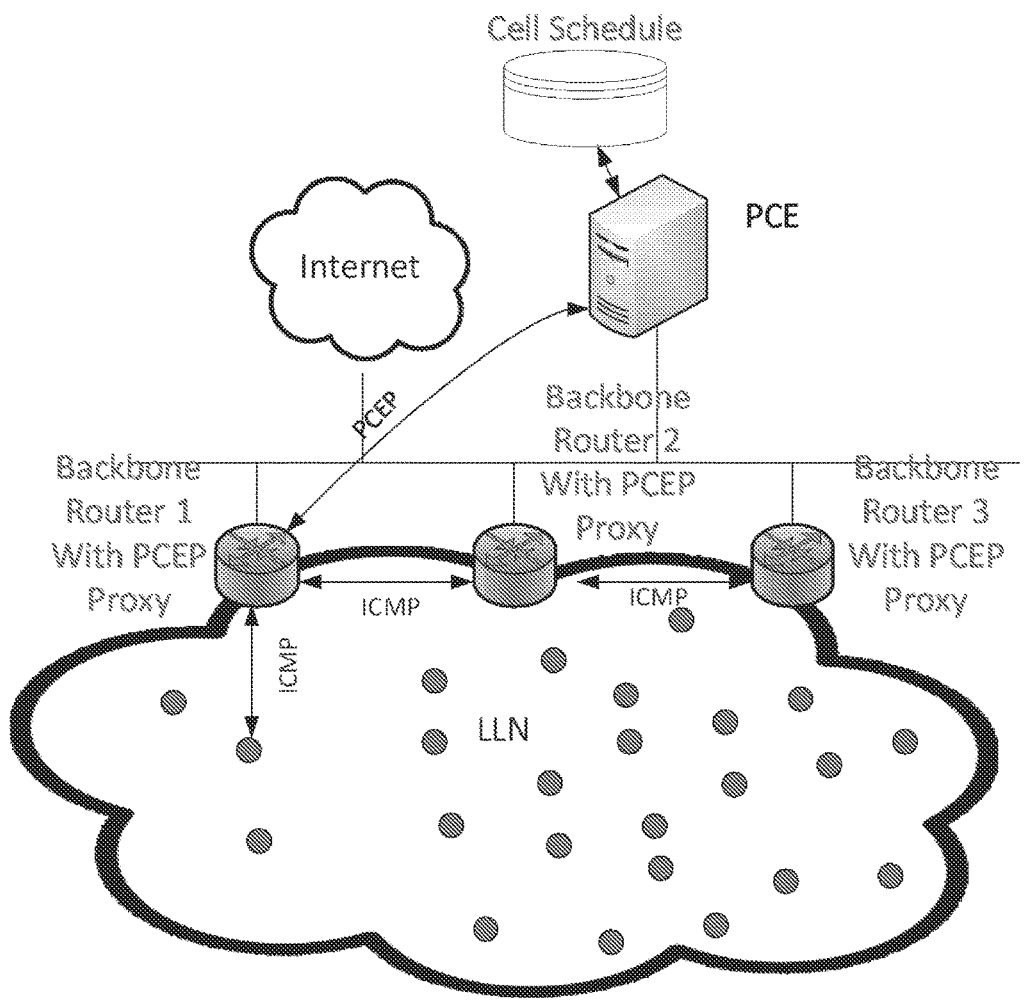
FIG. 12 illustrates a Backbone router assisted architecture to enhance communication between LLN devices and the PCE according to an embodiment of the application.

According to another aspect of the application, a method for reporting information from a LLN device to a PCE is disclosed. As illustrated in FIG. 12, a LLN device may report its TSCH Schedule in a TSCH Schedule Report Message to its closest PCE Proxy on the Backbone router using ICMP protocol, instead of directly reporting to the PCE using PCEP protocol.

As discussed earlier in this application, "Hard Cells" are configured by the central controller of the network. Therefore, the PCE knows this information when it allocates new resources. However, "Soft Cells" are configured by each LLN device and so the PCE does not know this information.

Figure 13:
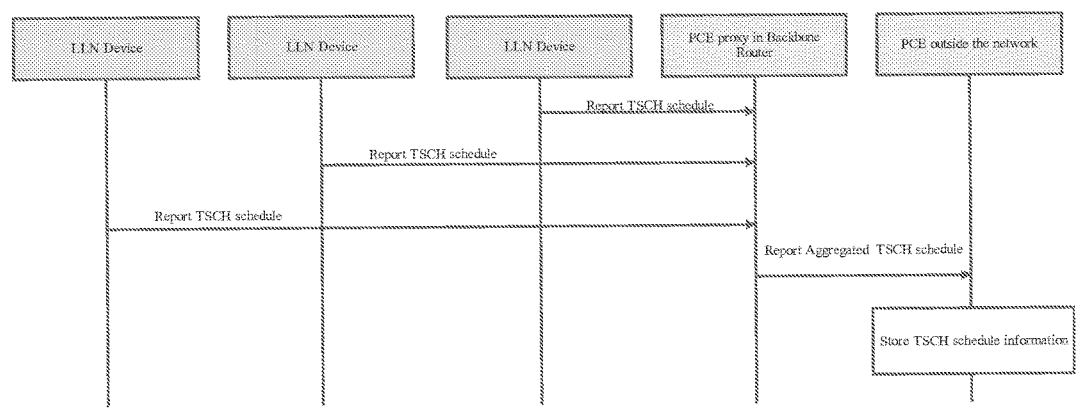
FIG. 13 illustrates a technique for a Backbone router assisted communication interface according to FIG. 12.

A call flow for this procedure is shown in FIG. 13 with each step denoted by a roman numeral, e.g., 1. Each LLN device in the 6TiSCH network is requested to periodically report its "Soft Cells" to the PCE so that it may efficiently allocate new resources (Step 1). A TSCH Schedule Reporting messages may include but are not limited to fields listed in Table 10 below.

TABLE 10

| Field Name | Description |
| --- | --- |
| Network Address | The IP address of the LLN device that sends the report message |
| Number of Soft Cells | The total number of Soft Cells in TSCH Schedule |
| Timeslot Offset of the 1$^{st}$ Soft Cell | The Timeslot Offset of the 1$^{st}$ Soft Cell in the TSCH Schedule of the LLN device |
| Channel Offset of the 1$^{st}$ Soft Cell | The Channel Offset of the 1$^{st}$ Soft Cell in the TSCH Schedule of the LLN device |

TABLE 10-continued

| Field Name | Description |
| --- | --- |
| Timeslot Offset of the subsequent Soft Cell | The Timeslot Offset of the subsequent Soft Cells in the TSCH Schedule of the LLN device |
| Channel Offset of the subsequent Soft Cell | The Channel Offset of the subsequent Soft Cells in the TSCH Schedule of the LLN device |

The PCE Proxy on the Backbone Router may aggregate TSCH Schedule Report messages received from LLN devices and then report these TSCH Schedules to the PCE using PCEP protocol (Step 2). The contents of an aggregated TSCH Schedule Report Message are shown in Table 11 below.

TABLE 11

| Field Name | Description |
| --- | --- |
| Number of aggregated messages | Number of TSCH Schedule Report Messages, N, contained in the message. |
| TSCH Schedule Report Message 1 | Information of the first TSCH Schedule Report Message as listed in Table 11 |
| TSCH Schedule Report Message 2 | Information of the second TSCH Schedule Report Message. |
| TSCH Schedule Report Message N | Information of the subsequent TSCH Schedule Report Message |

Further, the PCE stores the received TSCH Schedules in the Cell Schedule Database (Step 3). Each record stored in the Cell Schedule Database includes fields/parameters/attributes as shown in Table 12 below. The PCE may utilize the information stored in the Cell Schedule Database to efficiently compute and configure the Track.

TABLE 12

| Field Name | Description |
| --- | --- |
| LLN device Address | The IP address of the LLN device that reports the TSCH Schedule. |
| Proxy Address | The IP address of Backbone Router that forwards the TSCH Schedule report message. |
| Timeslot Offset of the 1$^{st}$ Scheduled Cell | The Timeslot Offset of the 1$^{st}$ Scheduled Cell in the TSCH Schedule of the LLN device |
| Channel Offset of the 1$^{st}$ Scheduled Cell | The Channel Offset of the 1$^{st}$ Scheduled Cell in the TSCH Schedule of the LLN device |
| Type of the 1$^{st}$ Scheduled Cell | The type of the 1$^{st}$ Scheduled Cell in the TSCH Schedule of the LLN device, either a Hard Cell or a Soft Cell |
| Timeslot Offset of the subsequent Scheduled Cell | The Timeslot Offset of the subsequent Scheduled Cell in the TSCH Schedule of the LLN device |
| Channel Offset of the last Scheduled Cell | The Channel Offset of the subsequent Scheduled Cell in the TSCH Schedule of the LLN device |
| Type of the last Scheduled Cell | The type of the last Scheduled Cell in the TSCH Schedule of the LLN device, either a Hard Cell or a Soft Cell |

According to yet another aspect of the application, a non-transitory computer-readable or executable storage medium for storing computer-readable or executable instructions is disclosed. The medium may include one or more computer-executable instructions such as disclosed above in the plural call flows according to FIGS. 6, 7, 9, 11 and 13. The computer executable instructions may be stored in a memory and executed by a processor disclosed above in FIGS. 4C and 4D, and employed in devices including LLN devices, Backbone routers and PCEs. In one embodiment, a computer-implemented LLN having a non-transitory memory and processor operably coupled thereto, as described above in FIGS. 4C and 4D, is disclosed. Specifically, the non-transitory memory has instructions stored thereon for allocating a Track in a network. The processor is configured to perform the instructions of: (i) sending a Track allocation request message in ICMP to a backbone router; (ii) receiving a Track allocation reply message from the backbone router; and (iii) sending a confirmation message to the backbone router.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A computer-implemented device comprising:
 a non-transitory memory having instructions stored thereon for allocating a track in a network; and
 a processor, operably coupled to the non-transitory memory, the processor configured to perform the steps of:
  receiving a track computation request in a path computation client communication protocol from a first path computation element proxy on a backbone router in the network;
  calculating the track extending from a source device to a destination device in the network; and
  sending a track message to one or more devices located in the track,
  wherein the track message includes a track computation reply message sent to the first path computation element proxy on the backbone router.

2. The device of claim 1, wherein the processor is further configured to send, via the first path computation element proxy on the backbone router, a track assignment message based upon the track computation reply message to the one or more devices.

3. The device of claim 1, wherein the processor is further configured to determine a second backbone router with which to configure one or more devices located on a track.

4. The device of claim 3, wherein the processor is further configured to send a track forward assignment message to a second path computation element proxy on the second backbone router positioned closer to the one or more devices on the track than the first path computation element proxy on the backbone router.

5. The device of claim 4, wherein the track forward assignment message is sent via the first path computation element proxy on the back processor.

6. The device of claim 1, wherein the calculating step includes a review of information in a cell schedule database, the information consisting of a device address, proxy address, timeslot offset of a first and subsequent scheduled cell, channel offset of the first and subsequent scheduled cell, type of the first and subsequent scheduled cell, and combinations thereof.

7. A computer-implemented method for allocating a track in a network comprising:
 receiving a track computation request in path computation client communication protocol from a first path computation element proxy on a backbone router in the network;
 calculating the track extending from a source device to a destination device; and
 sending a track message to one or more devices located in the track,
 wherein the track message includes a track computation reply message sent to the first path computation element proxy on the backbone router.

8. The method of claim 7, further comprising:
 sending, via the path computation element proxy on the backbone router, a track assignment message based upon the track computation reply message to the one or more devices.

9. The method of claim 7, further comprising:
 determining a second backbone router with which to configure the one or more devices located on the track.

10. The method of claim 9, further comprising:
 sending the track message including a track forward assignment message to a second path computation element proxy on the second backbone router positioned closer to the one or more devices on the track than the first path computation element proxy on the backbone router.

11. The method of claim 10, further comprising:
 sending, via the second path computation element proxy on the second backbone router, a track assignment message based upon the track forward assignment message to the one or more devices.

12. A computer-implemented device comprising:
 a non-transitory memory having instructions stored thereon for reporting time slotted channel hopping schedule information to a path computation element; and
 a processor, operably coupled to the non-transitory memory, the processor configured to perform the steps of:
  receiving, at a backbone router, the time slotted channel hopping schedule information from one or more devices;
  aggregating, at the backbone router, the received time slotted channel hopping schedule information; and
  sending, from the backbone router, the aggregated time slotted channel hopping schedule information to the path computation element.

13. The device of claim 12, wherein
 the time slotted channel hopping schedule information is received via an internet control messaging protocol message, and
 the aggregated time slot channel hopping schedule information is sent via a path computation client communication protocol message.

14. A computer-implemented method for reporting time slotted channel hopping schedule information to a path computation element comprising:
 receiving, at a backbone router, the time slotted channel hopping schedule information from one or more devices via an internet control messaging protocol message;
 aggregating, at the backbone router, the received time slotted channel hopping schedule information; and
 sending, from the backbone router, the aggregated time slotted channel hopping schedule information to a path computation element via a path computation client communication protocol message.

15. A computer-implemented device comprising:
 a non-transitory memory having instructions stored thereon for allocating a track in a network; and a processor, operably coupled to the non-transitory memory, the processor configured to perform the steps of:

sending a track allocation request message in internet control messaging protocol to a backbone router;

receiving a track allocation reply message from the backbone router;

sending a confirmation message to the backbone router; and reporting a time slotted channel hopping schedule to the backbone router.

16. The device of claim 15, wherein the track allocation reply message received by the processor includes information selected from a track id, source address, destination address, outgoing cells and combinations thereof.

* * * * *